(No Model.)
A. L. H. MESSMER.
VEHICLE WHEEL TIRE.
No. 469,029. Patented Feb. 16, 1892.
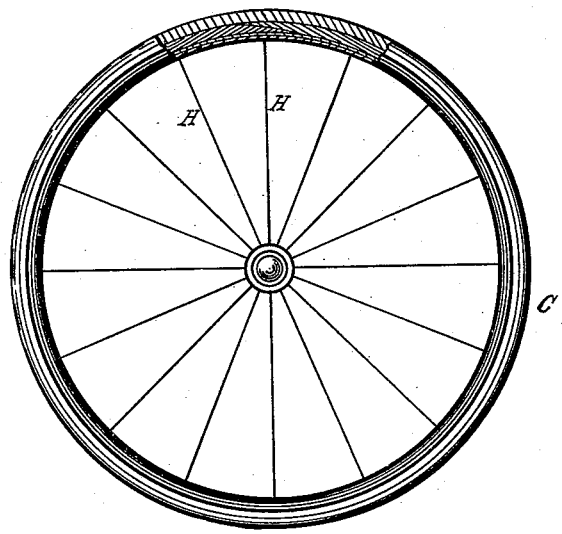
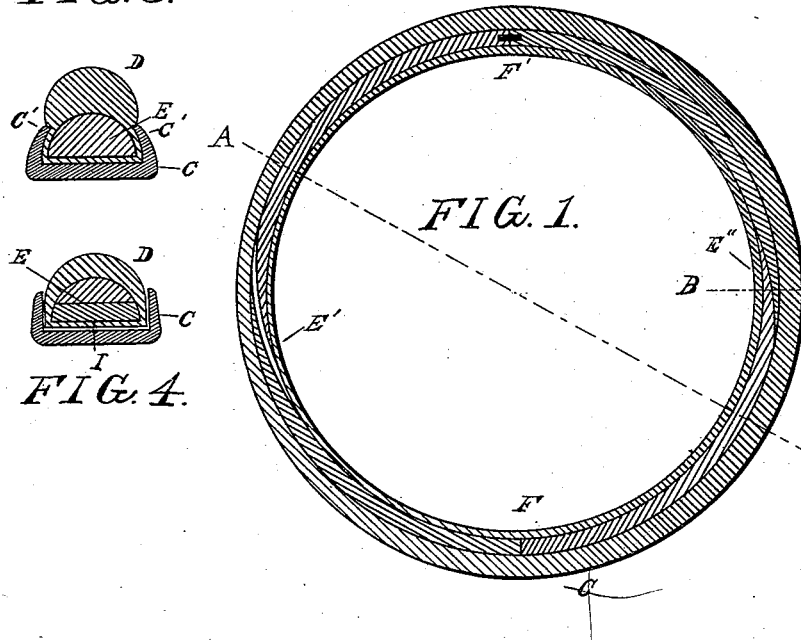
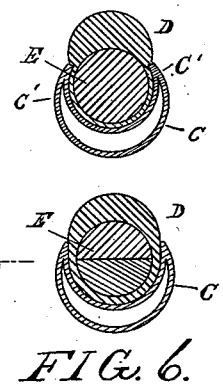
WITNESSES:
E. A. Colburn
M. M. Autzen
INVENTOR
Alexander L. H. Messmer,
BY Henry J. Colburn
ATTORNEY

UNITED STATES PATENT OFFICE.

ALEXANDER L. H. MESSMER, OF GARDNER, MASSACHUSETTS, ASSIGNOR TO HEYWOOD BROTHERS & CO., OF SAME PLACE.

VEHICLE-WHEEL TIRE.

SPECIFICATION forming part of Letters Patent No. 469,029, dated February 16, 1892.

Application filed January 22, 1891. Serial No. 378,676. (No model.)

*To all whom it may concern:*

Be it known that I, ALEXANDER L. H. MESSMER, a citizen of the United States, residing at Gardner, in the county of Worcester and State of Massachusetts, have invented certain new and useful Improvements in Vehicle-Wheels; and I do hereby declare the following to be a full, clear, and exact description of the invention, such as will enable others skilled in the art to which it appertains to make and use the same.

My invention relates to improvements in vehicle-wheels of that class whereon bands of various kinds are employed upon their peripheries; and the objects of my improvements are, first, to produce an improved band of this class consisting of an inner inelastic and dense band or ring constructed so as to adapt it to be elongated to increase its length, and an outer elastic and tubular band completely encircling the inelastic band or ring, the combined band or tire being secured in the rim of the wheel in such a manner as to cushion it in place and prevent its dislocation or injury. I attain these objects by the mechanism illustrated in the accompanying drawings, in which—

Figure 1 is a vertical section (cut through its plane of revolution) of the entire wheel-rim and band. Fig. 2 is a vertical side view of a complete wheel having a portion of its rim cut away. Fig. 3 is a section on line A. Fig. 4 is a section on line B. Fig. 5 is a section on line A, and is a modification of the form shown in Fig. 3. Fig. 6 is a section on line B, and is a modification of the form shown in Fig. 4.

Similar letters refer to similar parts throughout the several views.

C is the rim rolled circular, as shown in Figs. 1 and 2, and channeled, as shown in Fig. 4, or in a modified form, as shown in Fig. 6, wherein the said rim is of the well-known hollow form.

In Fig. 4, D is a band of elastic material, preferably of rubber or analogous substance, molded around so as to completely encircle a rim or band of material E, which is somewhat denser than the elastic band D, and is of a substance such as cane, or preferably a dense fibrous or rigid material of a somewhat springing nature, and preferably placed nearer the side of the gum, which contacts with the channeled rim, the object of such locating being, first, to secure the maximum elasticity of material employed and the best economy in its use, and, second, to accomplish a more secure joining together of all the parts composing the said wheel-rim, as will be hereinafter shown.

The band E is lapped or scarfed together obliquely, as shown at E' in Fig. 1, or when made of two or more pieces of material, a series of such laps E' E'', &c., or made in one or more pieces and their flat meeting ends are butted together, as shown at F' in Fig. 1, or they may simply meet, as shown at F in Fig. 1, or be pinned or doweled together, the main object always being to so contract the said core E as to adapt it to be enlarged and diminished in diameter for the purpose of applying it to the channeled rim C.

My improved wheel is assembled as follows: The channeled rim C, having been formed and securely attached to its hub by means of spokes 4, in the ordinary well-known manner, and the combined tire D E having been prepared as shown and described, the said combined tire is then applied to the channeled rim C by being strained apart at one or more of the laps or divisions in said core and placed within the channel of said rim, when the fastening or locking of said tire within said rim is completed by rolling or closing inwardly upon said tire the edges of the said channeled rim C, as shown in Figs. 3, 5, and 6, thereby completing the wheel. It will be seen that at this time said edges of the rim C rest against the elastic band D, where the latter surrounds the inelastic band, and by this means the complete tire is held on the rim with a somewhat yielding force. I should have said that the elastic band is molded so as to be somewhat thicker outside the inelastic band or "core" than at its sides, and beneath it, as seen in the sectional views, and in this manner all possibility of the band D condensing and pulling or rolling out of the rim C is avoided, yet as the band D is integrally carried down below and around the core E, it is impossible for it to become separated therefrom, and the combined tire is held firmly in place.

Having thus described my invention, what I claim is—

1. A tire consisting of a hard core having a curved outer face and a soft-rubber tubular covering entirely surrounding the core and being thickened at the outer side thereof and rounded on its outer face, combined with a wheel-rim below said base and having flanges pressed against and embedding the thin sides of the rubber covering opposite the sides of the core, substantially as set forth.

2. A tire consisting of a core in sections having obliquely cut and lapping ends sliding circumferentially on each other and an elastic and longitudinally-expansive covering on said core, combined with a flanged wheel-rim, substantially as set forth.

3. A tire consisting of a core made in sections having certain of their ends cut obliquely and lapping so as to slide on each other and a tubular covering entirely surrounding said core and thicker at the outer side thereof, combined with a flanged wheel-rim, substantially as set forth.

In testimony whereof I affix my signature in presence of two witnesses.

ALEXANDER L. H. MESSMER.

Witnesses:
 CHARLES B. BOYCE,
 THATCHER B. DUNN.